United States Patent [19]

Gelenius

[11] 4,262,237
[45] Apr. 14, 1981

[54] COMMUTATORLESS DIRECT CURRENT MOTOR DRIVE SYSTEM

[75] Inventor: Robert B. Gelenius, Davison, Mich.

[73] Assignee: General Motors Corporation, Detroit, Mich.

[21] Appl. No.: 46,911

[22] Filed: Jun. 8, 1979

[51] Int. Cl.³ .............................................. H02P 6/02
[52] U.S. Cl. .................................. 318/254; 318/138; 318/439
[58] Field of Search ........................ 318/138, 254, 439

[56] References Cited

U.S. PATENT DOCUMENTS

| | | | |
|---|---|---|---|
| 3,569,806 | 3/1971 | Brailsford | 318/254 |
| 3,611,081 | 10/1971 | Watson | 318/138 |
| 4,114,073 | 9/1978 | Uzuka | 318/138 |
| 4,162,435 | 7/1979 | Wright | 318/138 |

Primary Examiner—B. Dobeck
Assistant Examiner—John W. Redman
Attorney, Agent, or Firm—Richard G. Stahr

[57] ABSTRACT

A commutatorless direct current motor drive system that initiates rotation of a permanent magnet rotor from standstill upon the application of supply potential and then sustains rotor rotation by sequentially energizing the polyphase stator phase windings in response to the alternating current potential waveforms induced in the stator phase windings by the magnetic field of the permanent magnet rotor upon rotor rotation.

5 Claims, 3 Drawing Figures

COMMUTATORLESS DIRECT CURRENT MOTOR DRIVE SYSTEM

This invention is directed to a drive system for commutatorless direct current motors of the type having a permanent magnet rotor and polyphase stator phase windings and, more specifically, to a drive system of this type that initiates permanent magnet rotor rotation from standstill upon the application of supply potential and sustains rotor rotation by sequential energization of the polyphase stator phase windings in response to the phase displaced alternating current potential waveforms induced in the stator phase windings upon rotor rotation.

Commutatorless direct current electric motors are well known in the art. Typically, these motors have a permanent magnet rotor that is magnetized with alternate magnetic poles across the rotor diameter and a polyphase stator having a plurality of phase windings that may be individually energized by an applied supply potential source. To sustain rotor rotation, the stator phase windings are sequentially energized to produce a rotating magnetic field. Motors of this type, therefore, require a method for determining rotor position so that the individual stator phase windings may be sequentially energized at the proper time relative to rotor position. Typically, optical devices, Hall effect devices or high frequency energized transformers are employed to detect rotor position and produce switch signals at the proper rotor positions to sequentially energize the stator phase windings in a manner to sustain rotor rotation. As these rotor position sensing devices require provisions for mounting them on the motor and present maintenance problems, a commutatorless direct current motor drive system that does not require rotor position sensing devices is desirable.

It is, therefore, an object of this invention to provide an improved commutatorless direct current motor drive system.

It is another object of this invention to provide an improved commutatorless direct current motor drive system that is capable of initiating rotor rotation from standstill upon the application of supply potential and sustaining rotor rotation after start.

It is an additional object of this invention to provide an improved commutatorless direct current motor drive system that provides for the sequential energization of the phase windings of a polyphase stator in response to the phase displaced alternating current potential waveforms induced in the stator phase windings by the magnetic field of the permanent magnet rotor upon rotor rotation.

In accordance with this invention, a commutatorless direct current motor drive system is provided wherein the polyphase stator phase windings of the motor are individually energized in sequence by an applied supply potential source in response to the phase displaced alternating current potential waveforms induced in the stator phase windings by the magnetic field produced by a permanent magnet rotor upon rotor rotation.

For a better understanding of the present invention, together with additional objects, advantages and features thereof, reference is made to the following description and accompanying drawing in which.

Figure 1:
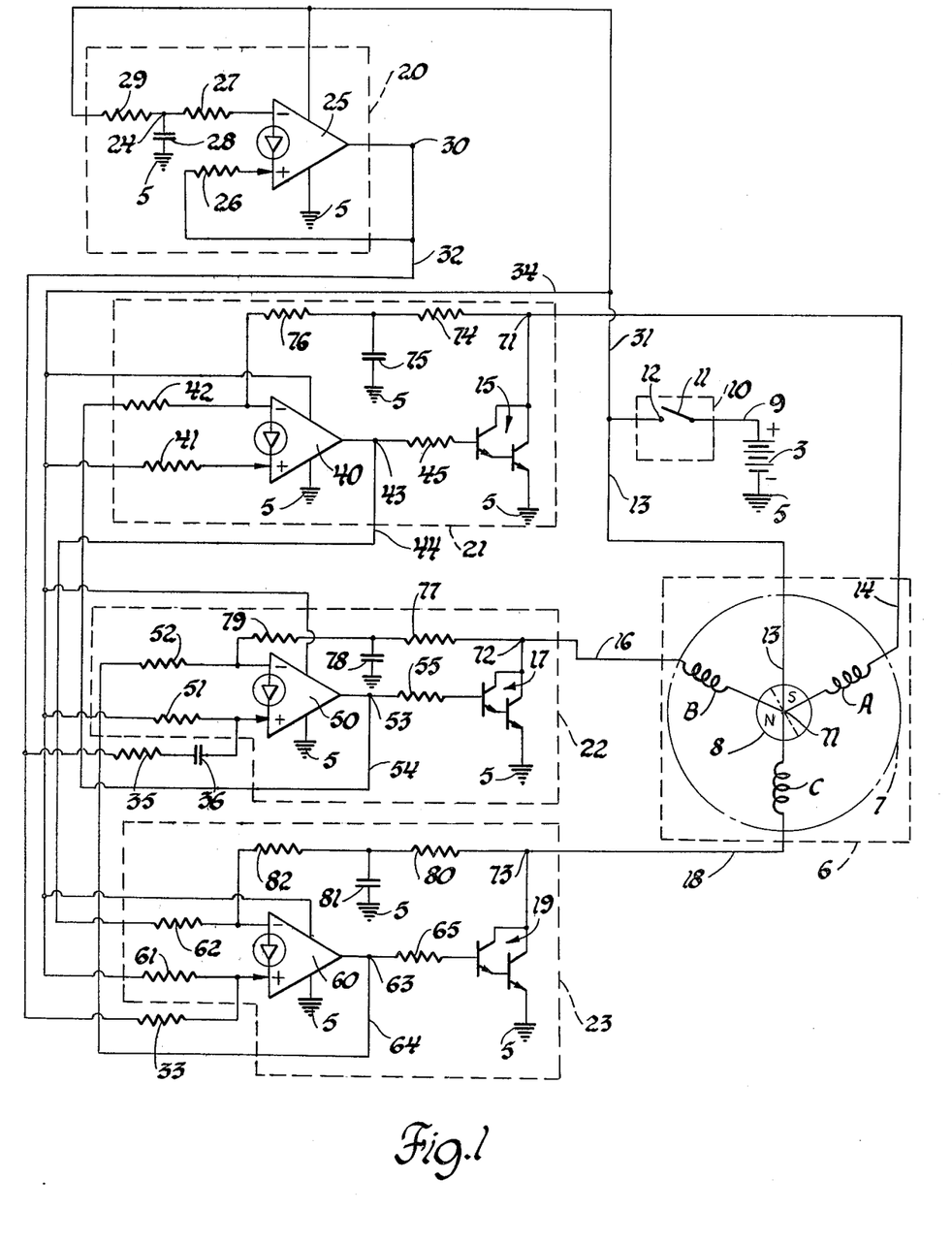
FIG. 1 sets forth the commutatorless direct current motor drive system of this invention in schematic form.

As point of reference or ground potential is the same point electrically throughout the system, it is illustrated in FIG. 1 by the accepted schematic symbol and referenced by the numeral 5.

The supply potential source may be a conventional storage battery 3 or any other suitable direct current potential source having current and voltage capabilities consistent with the requirements of the application.

Briefly, the commutatorless direct current motor drive system of this invention is for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases.

The commutatorless direct current motor drive system of this invention employs four operational amplifier circuits. In an actual embodiment, the operational amplifier circuits employed are of the Norton type such as those marketed commercially by the National Semiconductor Corporation under the designation LM3900. As these operational amplifier circuits may be commercially available items well known in the art and, per se, form no part of this invention, each has been illustrated in FIG. 1 of the drawing by the accepted schematic symbol for Norton type operational amplifiers. Furthermore, the Norton type operational amplifier circuit is only an example of an operational amplifier circuit suitable for use with the system of this invention, consequently, there is no intention or inference of a limitation thereto as other circuit elements having similar electrical characteristics may be substituted therefor without departing from the spirit of the invention. Whereas the conventional operational amplifier circuit differences input voltages, the Norton type operational amplifier circuit differences input currents. Therefore, large valued external input resistors are employed to convert from input voltages to input currents. Briefly, the Norton type operational amplifier circuit operates in such a manner that when current flow into the plus (+) input terminal is of a magnitude greater than that flowing into the minus (−) input terminal, the output signal of the device rises to a magnitude substantially equal to supply potential and when current flow into the minus (−) input terminal is of a magnitude greater than that flowing into the plus (+) input terminal, the output signal of the device goes to substantially ground potential.

The commutatorless direct current motor 6 includes a polyphase stator 7 having three stator phase windings A, B and C and a permanent magnet rotor 8 magnetized across the diameter thereof with north and south magnetic poles. The motor illustrated in FIG. 1 is of the two-pole permanent magnet rotor type having a three-phase stator with one terminal end of each of the three stator phase windings connected to a common node N. The permanent magnet rotor 8 is arranged to be rotated in magnetic coupling relationship with the stator phase windings A, B and C whereby upon rotor 8 rotation, the rotor 8 magnetic field induces alternating current potential waveforms in the stator phase windings A, B and C that are phase displaced from each other by the number of electrical degrees determined by the number of stator phases. With a three-phase stator as illustrated in FIG. 1, these induced alternating current potential waveforms are phase displaced from each other by 120 electrical degrees.

The supply potential source, battery 3 may be applied across and disconnected from the commutatorless direct current motor drive system of this invention by a single pole-single throw electrical switch 10 having a movable contact 11 and a stationary contact 12 or any other suitable electrical switching device.

In a manner later to be explained, stator phase windings A, B, and C may be individually energized by an applied supply potential source such as battery 3 through respective individual stator phase winding energizing circuits, each of which is arranged for connection across an external supply potential source. The energizing circuit for stator phase winding A includes lead 9, movable contact 11 and stationary contact 12 of switch 10, lead 13, node N, stator phase winding A, lead 14, the current carrying elements of NPN transistor Darlington pair 15 and point of reference or ground potential 5. The energizing circuit for stator phase winding B includes lead 9, movable contact 11 and stationary contact 12 of switch 10, lead 13, node N, stator phase winding B, lead 16, the current carrying elements of NPN transistor Darlington pair 17 and point of reference or ground potential 5. The energizing circuit for stator phase winding C includes lead 9, movable contact 11 and stationary contact 12 of switch 10, lead 13, node N, stator phase winding C, lead 18, the current carrying elements of NPN transistor Darlington pair 19 and point of reference or ground potential 5. These energizing circuits are arranged for connection across an external supply potential source through lead 9 and switch 10 and through point of reference or ground potential 5.

The commutatorless direct current motor drive system of this invention is composed of one start circuit including the circuitry set forth within dashed-line enclosure 20 for initiating rotor 8 rotation from standstill whereby the phase displaced potential waveforms are initially induced in the stator phase windings A, B and C and three identical commutation circuits, each including the circuitry set forth within respective dashed-line enclosures 21, 22 and 23. In a manner to be later brought out in detail, the commutation circuits 21, 22 and 23 are responsive to the phase displaced potential waveforms induced in stator phase windings A, B and C for sustaining rotor 8 rotation by sequentially completing and later interrupting the respective hereinabove-described individual stator phase winding energizing circuits. Each of commutation circuits 21, 22 and 23 corresponds to a respective stator phase winding A, B and C and each is operated to effect the completion of the stator phase winding energizing circuit for the stator phase winding to which it corresponds in response to each negative going portion of the potential waveform induced in that stator phase winding and to effect the interruption of this energizing circuit in response to the operation of another one of the commutation circuits corresponding to another one of the stator phase windings to effect the completion of the energizing circuit for that stator phase winding whereby, after initiation of rotor 8 rotation from standstill by start circuit 20, the stator phase windings A, B and C are sequentially energized and later deenergized in response to the phase displaced alternating current potential waveforms induced in the stator phase windings A, B and C to produce a rotating magnetic field that sustains rotor 8 rotation.

While rotor 8 is rotating, the magnetic field of rotating rotor 8 induces alternating current potential waveforms in stator phase windings A, B and C that are phase displaced from each other by 120 electrical degrees and are superimposed upon the direct current potential level of the supply potential source as illustrated by the curve of FIG. 2A wherein the supply potential source potential level is referenced by the notation B+. These induced potential waveforms are of a frequency and amplitude directly proportional to the rotational speed of rotor 8. In a manner to be later explained, the NPN transistor Darlington pairs 15, 17 and 19 are conductive part of the time and not conductive part of the time. While NPN transistor Darlington pair 15 is not conductive, the potential level upon junction 71 is substantially equal to the sum of the alternating current potential waveform induced in stator phase winding A by the rotor 8 magnetic field and the potential level of the supply potential source and while NPN transistor Darlington pair 15 is conductive, the potential level upon junction 71 is substantially ground, as illustrated by the curve of FIG. 2B. While NPN transistor Darlington pair 17 is not conductive, the potential level upon junction 72 is substantially equal to the sum of the alternating current potential waveform induced in stator phase winding B by the rotor 8 magnetic field and the potential level of the supply potential source and while NPN transistor Darlington pair 17 is conductive, the potential level upon junction 72 is substantially ground as illustrated by the curve of FIG. 2C. While NPN transistor Darlington pair 19 is not conductive, the potential level upon junction 73 is substantially equal to the sum of the alternating current potential waveform induced in stator phase winding C by the rotor 8 magnetic field and the potential level of the supply potential source and while NPN transistor Darlington pair 19 is conductive, the potential level upon junction 73 is substantially ground, as illustrated by the curve of FIG. 2D.

The start circuit 20 includes Norton operational amplifier circuit 25, input resistors 26 and 27, capacitor 28 and resistor 29. Upon the initial application of supply potential by operating movable contact 11 of switch 10 into electrical circuit closing engagement with stationary contact 12, all of the capacitors of the system are discharged. Consequently, junction 24 is at substantially ground potential and capacitor 28 begins to charge from battery 3 through lead 9, the closed contacts of switch 10, lead 31 and resistor 29. Therefore, upon the initial application of supply potential, Norton operational amplifier circuit 25 of start circuit 20 is triggered to the condition in which the output signal thereof upon junction 30 is of a potential level substantially equal to supply potential. The duration of this output start signal is determined by the RC time constant of the circuit network including input resistor 27, capacitor 28 and resistor 29. When capacitor 28 has become charged, battery 3 supplies more current through input resistor 27 to the minus (−) input terminal of Norton operational amplifier circuit 25 than is supplied through input resistor 26 to the plus (+) input terminal thereof. This greater current into the minus (−) input terminal triggers Norton operational amplifier circuit 25 to the condition in which junction 30 is substantially ground potential to terminate the start signal pulse. Start circuit 20, therefore, produces an electrical output signal pulse of a predetermined duration upon the application of supply potential. In the actual embodiment of the system of this invention, this output start signal pulse is of a duration of the order of thirty (30) milliseconds. The start circuit 20 output signal pulse is graphically illustrated in FIG. 3D.

The output start signal pulse supplies current through lead 32 and resistor 33 to the plus (+) input terminal of Norton operational amplifier circuit 60 of commutation circuit 23. This current is arranged to be of such a magnitude that the sum of this current plus the magnitude of current supplied by battery 3 to the same plus (+) input terminal through lead 9, the closed contacts of switch 10, leads 31 and 34 and input resistor 61 is of a sufficient magnitude to force the triggering of Norton operational amplifier circuit 60 to the condition in which the output signal thereof upon junction 63 is of a potential level substantially equal to supply potential. This output signal supplies current through lead 64 and input resistor 52 of commutation circuit 22 to the minus (−) input terminal of Norton operational amplifier circuit 50. The ohmic values of input resistors 51 and 52 of Norton operational amplifier circuit 50 are so selected relative to each other that the output signal of Norton operational amplifier circuit 60 supplies more current to the minus (−) input terminal of Norton operational amplifier circuit 50 than is supplied by battery 3 to the plus (+) input terminal thereof through lead 9, the closed contacts of switch 10, leads 31 and 34 and input resistor 51 to effect the triggering of Norton operational amplifier circuit 50 to the condition in which the output signal thereof upon junction 53 is substantially ground potential. As this substantially ground potential signal supplies no current through lead 54 and input resistor 42 of commutation circuit 21 to the minus (−) input terminal of Norton operational amplifier circuit 40, the current supplied by battery 3 to the plus (+) input terminal of Norton operational amplifier circuit 40 through lead 9, the closed contacts of switch 10, leads 31 and 34 and input resistor 41 triggers Norton operational amplifier circuit 40 to the condition in which the output signal thereof upon junction 43 is of a potential level substantially equal to supply potential. This output signal supplies current through lead 44 and input resistor 62 of commutation circuit 23 to the minus (−) input terminal of Norton operational amplifier circuit 60. The ohmic values of input resistors 61 and 62 and resistor 33 are so selected relative to each other than the output signal of Norton operational amplifier circuit 40 supplies more current to the minus (−) input terminal of Norton operational amplifier circuit 60 than is supplied by battery 3 to the plus (+) input terminal thereof through lead 9, the closed contacts of switch 10, leads 31 and 34 and input resistor 61 but supplies less current than the sum of the currents supplied by battery 3 and the start signal pulse. Consequently, the start signal pulse effects the force triggering of Norton operational amplifier circuit 60 to the condition in which the output signal thereof upon junction 63 is of a potential level substantially equal to supply potential and maintains this device in this condition for the duration of the start signal pulse. At this time immediately subsequent to the application of supply potential, an electrical signal of a potential level substantially equal to supply potential is present upon junction 43; an electrical signal of substantially ground potential is present upon junction 53 and, for the duration of the start signal pulse, an electrical signal of a potential level substantially equal to supply potential is present upon junction 63.

Figure 3:
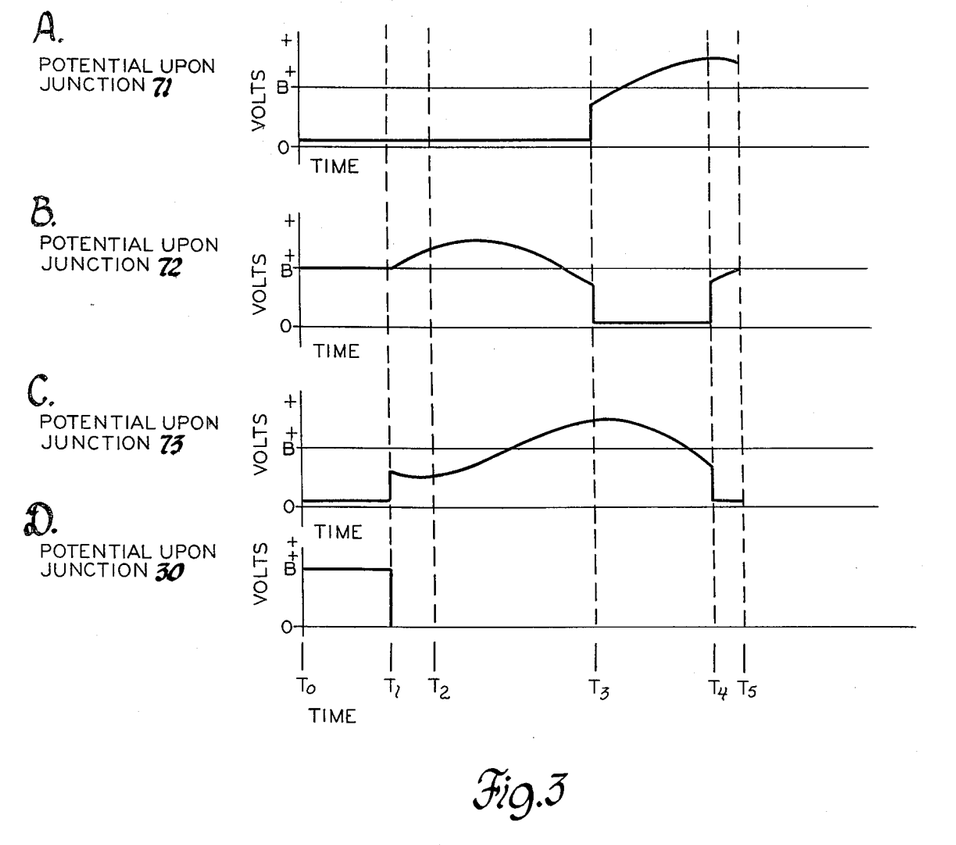

The electrical signal of a potential level substantially equal to supply potential upon junction 43 supplies base drive current through resistor 45 to NPN transistor Darlington pair 15 to render this device conductive through the current carrying elements thereof; the substantially ground potential signal upon junction 53 does not supply base drive current to NPN transistor Darlington pair 17 and, for the duration of the start signal pulse, the electrical signal of a potential level substantially equal to supply potential upon junction 63 supplies base drive current through resistor 65 to NPN transistor Darlington pair 19 to render this device conductive through the current carrying elements thereof. Therefore, NPN transistor Darlington pairs 15 and 19 are conductive and NPN transistor Darlington pair 17 is not conductive. Referring to FIG. 3 wherein the supply potential source potential level is referenced by the notation B+, the time $T_o$ corresponds to the instant of closure of movable contact 11 of switch 10 into electrical circuit closing engagement with stationary contact 12. As NPN transistor Darlington pairs 15 and 19 are conductive upon the closure of switch 10, the potential level upon respective junctions 71 and 73 is substantially ground, as illustrated by the curves of FIGS. 3A and 3C, and as NPN transistor Darlington pair 17 is not conductive, the potential level upon junction 72 is substantially equal to the supply potential level, as illustrated by the curve of FIG. 3B.

Conducting NPN transistor Darlington pair 15 completes the previously described energizing circuit for stator phase winding A that may be traced from the positive polarity output terminal of battery 3, through lead 9, the closed contacts of switch 10, lead 13, node N, stator phase winding A, lead 14, the current carrying elements of conducting NPN transistor Darlington pair 15 and point of reference or ground potential 5 to the negative polarity output terminal of battery 3. Conducting NPN transistor Darlington pair 19 completes the previously described energizing circuit for stator phase winding C that may be traced from the positive polarity output terminal of battery 3, through lead 9, the closed contacts of switch 10, lead 13, node N, stator phase winding C, lead 18, the current carrying elements of conducting NPN transistor Darlington pair 19 and point of reference or ground potential 5 to the negative polarity output terminal of battery 3. Upon the energization of stator phase windings A and C, rotor 8 aligns with the resultant magnetic field produced by these two energized stator phase windings that falls substantially halfway between stator phase windings A and C. In a manner as previously explained, upon the termination of the start signal pulse upon junction 30 at time $T_1$, junction 30 and the terminal end of resistor 35 of commutation circuit 22 connected to junction 30 go to substantially ground potential. Therefore, a charge current for capacitor 36 begins to flow out of the plus (+) input terminal of Norton operational amplifier circuit 50 and the current supplied by the start signal pulse to the plus (+) input terminal of Norton operational amplifier circuit 60 of commutation circuit 23 terminates. While capacitor 36 charges through resistor 35, Norton operational amplifier circuit 50 is maintained in the condition in which the output signal thereof upon junction 53 is substantially ground potential and the current flow supplied by the output signal of Norton operational amplifier circuit 40 through lead 44 and input resistor 62 to the minus (−) input terminal of Norton operational amplifier circuit 60 of commutation circuit 23 triggers Norton operational amplifier circuit 60 to the condition in which the output signal thereof upon junction 63 is substantially ground potential. As this substantially ground potential signal supplies no base drive current to NPN transistor Darlington pair 19, this NPN transistor Darlington pair 19 is rendered not conductive to interrupt the previously described stator phase winding C energizing circuit. At time $T_1$, stator phase winding A remains energized and stator phase windings B and C are deenergized. Consequently, the potential level upon junction 71 remains at substantially ground potential, the potential level upon junction 72 remains at substantially the supply potential level and the potential level upon junction 73 tends to rise toward the supply potential level, as illustrated by respective curves 3A, 3B and 3C. Upon the deenergization of stator phase winding C, the magnetic field produced by still energized stator phase winding A is in a counterclockwise direction, as viewing FIG. 1, from the resultant magnetic field produced by energized stator phase windings A and C. This shift of stator magnetic field initiates rotation of rotor 8 in a counterclockwise direction, as viewing FIG. 1, at a speed greater than the minimum commutation speed. Upon this initiation of rotor 8 rotation at time $T_1$, the magnetic field thereof begins to induce the aforementioned alternating current potential waveforms in deenergized stator phase windings B and C, as illustrated by respective curves 3B and 3C. At some time $T_2$ subsequent to the deenergization of stator phase winding C at time $T_1$, as determined by the RC time constant of resistor 35 and capacitor 36, capacitor 36 becomes charged to the point at which battery 3 supplies current through input resistor 51 to the plus (+) input terminal of Norton operational amplifier circuit 50 of commutation circuit 22 through lead 9, the closed contacts of switch 10, leads 31 and 34 and input resistor 51. However, at this time $T_2$ the alternating current potential waveform induced in stator phase winding B has increased the potential level upon junction 72 above the supply potential level. This increased potential level upon junction 72 supplies more current through resistors 77 and 79 to the minus (−) input terminal of Norton operational amplifier circuit 50 than is supplied by battery 3. Consequently, Norton operational amplifier circuit 50 is maintained in the condition in which the output signal thereof upon junction 53 is still substantially ground to maintain NPN transistor Darlington pair 17 not conductive. Therefore, stator phase winding A remains energized and stator phase windings B and C remain deenergized. As rotor 8 rotates in a counterclockwise direction between times $T_1$ and $T_3$, the potential waveform induced in stator phase winding B increases in a positive going direction from the supply potential level, passes through maximum and decreases in a negative going direction through the supply potential level and the potential waveform induced in stator phase winding C passes through the maximum negative polarity half cycle value, increases in a positive direction through the supply potential level toward the maximum positive polarity half cycle value. In a manner to be explained in more detail later in this specification, at time $T_3$ the current supplied by the potential level upon junction 72 through resistors 77 and 79 to the minus (−) input terminal of Norton operational amplifier circuit 50 is less than that supplied by battery 3 to the plus (+) input terminal of operational amplifier circuit 50. With a greater current flow into the plus (+) input terminal of Norton operational amplifier circuit 50 than is supplied to the minus (−) input terminal thereof, Norton operational amplifier circuit 50 is triggered to the condition in which the output signal thereof upon junction 53 is of a potential level substantially equal to supply potential. This output signal supplies base drive current through resistor 55 to the NPN transistor Darlington pair 17 and supplies current through lead 54 and input resistor 42 of commutation circuit 21 to the minus (−) input terminal of Norton operational amplifier circuit 40. The ohmic value of input resistors 41 and 42 of Norton operational amplifier circuit 40 are so selected relative to each other than the amount of current supplied by the output signal of Norton operational amplifier circuit 50 to the minus (−) input terminal of operational amplifier circuit 40 through lead 54 and input resistor 42 is greater than the magnitude of current supplied to the plus (+) input terminal of Norton operational amplifier circuit 40 by battery 3 through lead 9, closed contacts of switch 10, leads 31 and 34 and input resistor 41. As a consequence, Norton operational amplifier circuit 40 is triggered to the condition in which the output signal thereof upon junction 43 is substantially ground potential. As this substantially ground potential signal supplies no base drive current to NPN transistor Darlington pair 15, this NPN transistor Darlington pair 15 is rendered not conductive to interrupt the previously described stator phase winding A energizing circuit. Substantially simultaneously, the base drive current supplied to NPN transistor Darlington pair 17 triggers NPN transistor Darlington pair 17 conductive through the current carrying elements thereof to complete an energizing circuit for stator phase winding B that may be traced from the positive polarity output terminal of battery 3, through lead 9, the closed contacts of switch 10, lead 13, node N, stator phase winding B, lead 16, the current carrying elements of conducting NPN transistor Darlington pair 17 and point of reference or ground potential 5 to the negative polarity output terminal of battery 3. At time $T_3$, therefore, stator phase winding B is energized and stator phase windings A and C are deenergized. Consequently, the potential level upon junction 72 goes to substantially ground potential, the potential level upon junction 73 is substantially equal to the sum of the induced potential waveform plus the supply potential level and the potential level upon junction 71 tends to rise toward the supply potential level, as illustrated by respective curves 3B, 3C and 3A. Upon the substantially simultaneous deenergization of stator phase winding A and energization of stator phase winding B, the stator magnetic field produced by stator phase winding B is in a counterclockwise direction, as viewing FIG. 1, from that produced by energized stator phase winding A. This shift of the stator magnetic field maintains rotor 8 rotation in a counterclockwise direction, as viewing FIG. 1, at a speed greater than the minimum commutation speed. In a manner to be explained in more detail later in this specification, at time $T_4$ the current supplied by the potential level upon junction 73 through resistors 80 and 82 to the minus (−) input terminal of Norton operational amplifier circuit 60 is less than that supplied by battery 3 to the plus (+) input terminal of operational amplifier circuit 60. With a greater current flow into the plus (+) input terminal of Norton operational amplifier circuit 60 than is supplied to the minus (−) input terminal thereof, Norton operational amplifier circuit 60 is triggered to the condition in which the output signal thereof upon junction 63 is of a potential level substantially equal to supply potential. This output signal supplies base drive current through resistor 65 to the NPN transistor Darlington pair 19 and supplies current through lead 64 and input resistor 52 of commutation circuit 22 to the minus (−) input terminal of Norton operational amplifier circuit 50. The ohmic value of input resistors 51 and 52 of Norton operational amplifier circuit 50 are so selected relative to each other than the amount of current supplied by the output signal of Norton operational amplifier circuit 60 to the minus (−) input terminal of operational amplifier circuit 50 through lead 64 and input resistor 52 is greater than the magnitude of current supplied to the plus (+) input terminal of Norton operational amplifier circuit 50 by battery 3 through lead 9, closed contacts of switch 10, leads 31 and 34 and input resistor 51. As a consequence, Norton operational amplifier circuit 50 is triggered to the condition in which the output signal thereof upon junction 53 is substantially ground potential. As this substantially ground potential signal supplies no base drive current to NPN transistor Darlington pair 17, this NPN transistor Darlington pair 17 is rendered not conductive to interrupt the previously described stator phase winding B energizing circuit. Substantially simultaneously, the base drive current supplied to NPN transistor Darlington pair 19 triggers NPN transistor Darlington pair 19 conductive through the current carrying elements thereof to complete an energizing circuit for stator phase winding C that may be traced from the positive polarity output terminal of battery 3, through lead 9, the closed contacts of switch 10, lead 13, node N, stator phase winding C, lead 18, the current carrying elements of conducting NPN transistor Darlington pair 19 and point of reference or ground potential 5 to the negative polarity output terminal of battery 3. At time $T_4$, therefore, stator phase winding C is energized and stator phase windings A and B are deenergized. Consequently, the potential level upon junction 73 remains at substantially ground potential, the potential level upon junction 71 is substantially equal to the sum of the induced potential waveform plus the supply potential level and the potential level upon junction 72 tends to rise toward the supply potential level, as illustrated by respective curves 3C, 3A and 3B. Upon the substantially simultaneous deenergization of stator phase winding B and energization of stator phase winding C, the stator magnetic field produced by stator phase winding C is in a counterclockwise direction, as viewing FIG. 1, from that produced by energized stator phase winding B. This shift of the stator magnetic field maintains rotor 8 rotation in a counterclockwise direction, as viewing FIG. 1, at a speed greater than the minimum commutation speed. As rotor 8 is now rotating in a counterclockwise direction, as viewing FIG. 1, at a speed greater than the minimum commutation speed, the magnetic field of rotating rotor 8 continues to induce the aforementioned alternating current potential waveforms in stator phase windings A, B and C. So long as the contacts of switch 10 are maintained in the electrical circuit closed condition, the rotation of rotor 8 is hereinafter sustained by the operation of commutating circuits 21, 22 and 23 in a manner to be later explained in detail in this specification.

From the foregoing discussion, it is apparent that, upon the application of supply potential, start circuit 20 effects the initiation of rotor 8 rotation from standstill at a speed greater than minimum commutation speed. For a start of rotor 8 rotation in a clockwise direction, the energization of stator phase winding B rather than stator phase winding C may be forced upon the initial application of supply potential. This may be effected by applying the start signal pulse to the plus (+) input terminal of Norton operational amplifier circuit 50 of commutation circuit 22 and by connecting the series combination of resistor 35 and capacitor 36 to the plus (+) input terminal of Norton operational amplifier circuit 60 of commutation circuit 23. As will be brought out later in this specification, the system of this invention operates to sustain rotor 8 rotation after the initiation of rotor 8 rotation from standstill.

Commutation of NPN transistor Darlington pairs 15, 17 and 19 is achieved by sensing the potential level of the stator phase windings A, B and C. This commutation is effected by commutation circuits 21, 22 and 23 that are responsive to the phase displaced potential waveforms that are induced in stator phase windings A, B and C by the rotating magnetic field of rotor 8. The potential level of stator phase winding A appears upon junction 71 and is filtered by resistor 74 and capacitor 75. The potential level of stator phase winding B appears upon junction 72 and is filtered by resistor 77 and capacitor 78. The potential level of stator phase winding C appears upon junction 73 and is filtered by resistor 80 and capacitor 81. The combination of resistor 74 and capacitor 75 functions as a voltage peak follower circuit whereby the charge upon capacitor 75 follows the change of potential level upon junction 71; the combination of resistor 77 and capacitor 78 functions as a voltage peak follower circuit whereby the charge upon capacitor 78 follows the change of potential level upon junction 72; and the combination of resistor 80 and capacitor 81 functions as a voltage peak follower circuit whereby the charge upon capacitor 81 follows the change of potential level upon junction 73.

Curve 2A illustrates the alternating current potential waveforms induced in respective stator phase windings A, B and C and curves 2B, 2C and 2D illustrate the potential level upon each of respective junctions 71, 72 and 73 after rotor 8 rotation has been initiated by start circuit 20 and the rotation of rotor 8 is being maintained by the operation of commutation circuits 21, 22 and 23. In each of the curves of FIG. 2, the supply potential level is referenced by the notation B+. The operation of commutation circuits 21, 22 and 23 will be explained in detail with reference to the curves of FIG. 2.

As rotor 8 rotates between times $T_5$ and $T_6$, the alternating current potential waveform induced in stator phase winding B by the magnetic field of rotating rotor 8 that appears upon junction 72 increases from B+ in a positive going direction toward the maximum positive polarity potential level, as illustrated by curve 2C; the signal upon junction 73 remains at substantially ground potential as NPN transistor Darlington pair 19 is still conductive, as illustrated by curve 2D; and the alternating current potential waveform induced in stator phase winding A by the magnetic field of rotating rotor 8 that appears upon junction 71 decreases in a negative going direction through B+, as illustrated by curve 2B. The potential waveform upon junction 71 is followed by a corresponding charge upon capacitor 75. When, at time $T_6$ the charge upon capacitor 75 has decreased to a direct current potential level of a magnitude that is insufficient to supply more current through input resistor 76 to the minus (−) input terminal of Norton operational amplifier circuit 40 than is supplied by battery 3 to the plus (+) input terminal thereof through input resistor 41, Norton operational amplifier circuit 40 is abruptly triggered to the condition in which the output signal thereof upon junction 43 is of a positive polarity potential level substantially equal to supply potential level. This positive polarity potential signal upon junction 43 supplies base drive current through resistor 45 to NPN transistor Darlington pair 15 to trigger this transistor Darlington pair conductive through the current carrying element thereof to complete the previously described stator phase winding A energizing circuit and the potential signal upon junction 71 goes to substantially ground potential, as illustrated by curve 2B. The positive polarity potential signal upon junction 43 also supplies more current through lead 44 and input resistor 62 of commutation circuit 23 to the minus (−) input terminal of Norton operational amplifier circuit 60 than is supplied by battery 3 to the plus (+) input terminal thereof through input resistor 61 to abruptly trigger Norton operational amplifier circuit 60 to the condition in which the output signal thereof upon junction 63 is of substantially ground potential. With a substantially ground potential signal upon junction 63, NPN transistor Darlington pair 19 is rendered not conductive to interrupt the previously described stator phase winding C energizing circuit. Upon the interruption of the stator phase winding C energizing circuit, the alternating current potential waveform induced in stator phase winding C by the magnetic field of rotating rotor 8 is superimposed upon the direct current supply potential and appears upon junction 73, as illustrated by curve 2D.

As rotor 8 rotates between times $T_6$ and $T_7$, the alternating current potential waveform induced in stator phase winding C by the magnetic field of rotating rotor 8 that appears upon junction 73 passes through B+ from a negative to a positive polarity direction and further increases in a positive going direction toward the maximum positive polarity potential level, as illustrated by curve 2D; the signal upon junction 71 remains at substantially ground potential as NPN transistor Darlington pair 15 is still conductive, as illustrated by curve 2B; and the alternating current potential waveform induced in stator phase winding B by the magnetic field of rotating rotor 8 that appears upon junction 72 increases to and passes through the maximum positive polarity potential level and decreases in a nagative going direction through B+ as illustrated by 2C. The potential waveform upon junction 72 is followed by a corresponding charge upon capacitor 78. When, at time $T_7$ the charge upon capacitor 78 has decreased to a direct current potential level of a magnitude that is insufficient to supply more current through input resistor 79 to the minus (−) input terminal of Norton operational amplifier circuit 50 than is supplied by battery 3 to the plus (+) output terminal thereof through input resistor 51, Norton operational amplifier circuit 50 is abruptly triggered to the condition in which the output signal thereof upon junction 53 is of a positive polarity potential level substantially equal to the supply potential level. This positive polarity potential signal upon junction 53 supplies base drive current through resistor 55 to NPN transistor Darlington pair 17 to trigger this transistor Darlington pair conductive through the current carrying elements thereof to complete the previously described stator phase winding B energizing circuit and the potential signal upon junction 72 goes to substantially ground potential, as illustrated by curve 2C. The positive polarity potential signal upon junction 53 also supplies more current through lead 54 and input resistor 42 of commutation circuit 21 to the minus (−) input terminal of Norton operational amplifier circuit 40 than is supplied by battery 3 to the plus (+) input terminal thereof through input resistor 41 to trigger Norton operational amplifier circuit 40 to the condition in which the output signal thereof upon junction 43 is of substantially ground potential. With a substantially ground potential signal upon junction 43, NPN transistor Darlington pair 15 is rendered not conductive to interrupt the previously described stator phase winding A energizing circuit. Upon the interruption of the stator phase winding A energizing circuit, the alternating current potential waveform induced in stator phase winding A by the magnetic field of rotating rotor 8 is superimposed upon the direct current supply potential and appears upon junction 71, as illustrated by curve 2B.

As rotor 8 rotates between times $T_7$ and $T_8$, the alternating current potential waveform induced in stator phase winding A by the magnetic field of rotating rotor 8 that appears upon junction 71 passes through B+ from a negative to a positive polarity direction and further increases in a positive going direction toward the maximum positive polarity potential level, as illustrated by curve 2B; the signal upon junction 72 remains at substantially ground potential as NPN transistor Darlington pair 17 is still conductive, as illustrated by curve 2C; and the alternating current potential waveform induced in stator phase winding C by the magnetic field of rotating rotor 8 that appears upon junction 73 increases to and passes through the maximum positive polarity potential level and decreases in a negative going direction through B+ as illustrated by 2D. The potential waveform upon junction 73 is followed by a corresponding charge upon capacitor 81. When, at time $T_8$ the charge upon capacitor 81 has decreased to a direct current potential level of a magnitude that is insufficient to supply more current through input resistor 82 to the minus (−) input terminal of Norton operational amplifier circuit 60 than is supplied by battery 3 to the plus (+) output terminal thereof through input resistor 61, Norton operational amplifier circuit 60 is abruptly triggered to the condition in which the output signal thereof upon junction 63 is of a positive polarity potential level substantially equal to the supply potential level. This positive polarity potential signal upon junction 63 supplies base drive current through resistor 65 to NPN transistor Darlington pair 19 to trigger this transistor Darlington pair conductive through the current carrying elements thereof to complete the previously described stator phase winding C energizing circuit and the potential signal upon junction 73 goes to substantially ground potential, as illustrated by curve 2D. The positive polarity potential signal upon junction 63 also supplies more current through lead 64 and input resistor 52 of commutation circuit 21 to the minus (−) input terminal of Norton operational amplifier circuit 50 than is supplied by battery 3 to the plus (+) input terminal thereof through input resistor 51 to trigger Norton operational amplifier circuit 50 to the condition in which the output signal thereof upon junction 53 is of substantially ground potential. With a substantially ground potential signal upon junction 53, NPN transistor Darlington pair 17 is rendered not conductive to interrupt the previously described stator phase winding B energizing circuit. Upon the interruption of the stator phase winding B energizing circuit, the alternating current potential waveform induced in stator phase winding B by the magnetic field of rotating rotor 8 is superimposed upon the direct current supply potential and appears upon junction 72, as illustrated by curve 2C.

As rotor 8 rotates between times $T_8$ and $T_9$, the alternating current potential waveform induced in stator phase winding B by the magnetic field of rotating rotor 8 that appears upon junction 72 passes through B+ from a negative to a positive polarity direction and further increases in a positive going direction toward the maximum positive polarity potential level, as illustrated by curve 2C; the signal upon junction 73 remains at substantially ground potential as NPN transistor Darlington pair 19 is still conductive, as illustrated by curve 2D; and the alternating current potential waveform induced in stator phase winding A by the magnetic field of rotating rotor 8 that appears upon junction 71 increases to and passes through the maximum positive polarity potential level and decreases in a negative going direction through B+ as illustrated by 2B. The potential waveform upon junction 71 is followed by a corresponding charge upon capacitor 75. When, at time $T_9$ the charge upon capacitor 75 has decreased to a direct current potential level of a magnitude that is insufficient to supply more current through input resistor 76 to the minus ($-$) input terminal of Norton operational amplifier circuit 40 than is supplied by battery 3 to the plus (+) output terminal thereof through input resistor 41, Norton operational amplifier circuit 40 is abruptly triggered to the condition in which the output signal thereof upon junction 43 is of a positive polarity potential level substantially equal to the supply potential level. This positive polarity potential signal upon junction 43 supplies base drive current through resistor 45 to NPN transistor Darlington pair 15 to trigger this transistor Darlington pair conductive through the current carrying elements thereof to complete the previously described stator phase winding A energizing circuit and the potential signal upon junction 71 goes to substantially ground potential, as illustrated by curve 2B. The positive polarity potential signal upon junction 43 also supplies more current through lead 44 and input resistor 62 of commutation circuit 23 to the minus ($-$) input terminal of Norton operational amplifier circuit 60 than is supplied by battery 3 to the plus (+) input terminal thereof through input resistor 61 to trigger Norton operational amplifier circuit 60 to the condition in which the output signal thereof upon junction 63 is of substantially ground potential. With a substantially ground potential signal upon junction 63, NPN transistor Darlington pair 19 is rendered not conductive to interrupt the previously described stator phase winding C energizing circuit. Upon the interruption of the stator phase winding C energizing circuit, the alternating current potential waveform induced in stator phase winding C by the magnetic field of rotating rotor 8 is superimposed upon the direct current supply potential and appears upon junction 73, as illustrated by curve 2D.

As rotor 8 rotates between times $T_9$ and $T_{10}$, the alternating current potential waveform induced in stator phase winding C by the magnetic field of rotating rotor 8 that appears upon junction 73 passes through B+ from a negative to a positive polarity direction and further increases in a positive going direction toward the maximum positive polarity potential level, as illustrated by curve 2D; the signal upon junction 71 remains at substantially ground potential as NPN transistor Darlington pair 15 is still conductive, as illustrated by curve 2B; and the alternating current potential waveform induced in stator phase winding B by the magnetic field of rotating rotor 8 that appears upon junction 72 increases to and passes through the maximum positive polarity potential level and decreases in a negative going direction through B+ as illustrated by 2C. The potential waveform upon junction 72 is followed by a corresponding charge upon capacitor 78. When, at time $T_{10}$ the charge upon capacitor 78 has decreased to a direct current potential level of a magnitude that is insufficient to supply more current through input resistor 79 to the minus ($-$) input terminal of Norton operational amplifier circuit 50 than is supplied by battery 3 to the plus (+) output terminal thereof through input resistor 51, Norton operational amplifier circuit 50 is abruptly triggered to the condition in which the output signal thereof upon junction 53 is of a positive polarity potential level substantially equal to the supply potential level. This positive polarity potential signal upon junction 53 supplies base drive current through resistor 55 to NPN transistor Darlington pair 17 to trigger this transistor Darlington pair conductive through the current carrying elements thereof to complete the previously described stator phase winding B energizing circuit and the potential signal upon junction 72 goes to substantially ground potential, as illustrated by curve 2C. The positive polarity potential signal upon junction 53 also supplies more current through lead 54 and input resistor 42 of commutation circuit 21 to the minus ($-$) input terminal of Norton operational amplifier circuit 40 than is supplied by battery 3 to the plus (+) input terminal thereof through input resistor 41 to trigger Norton operational amplifier circuit 40 to the condition in which the output signal thereof upon junction 43 is of substantially ground potential. With a substantially ground potential signal upon junction 43, NPN transistor Darlington pair 15 is rendered not conductive to interrupt the previously described stator phase winding A energizing circuit. Upon the interruption of the stator phase winding A energizing circuit, the alternating current potential waveform induced in stator phase winding A by the magnetic field of rotating rotor 8 is superimposed upon the direct current supply potential and appears upon junction 71, as illustrated by curve 2B.

Figure 2:
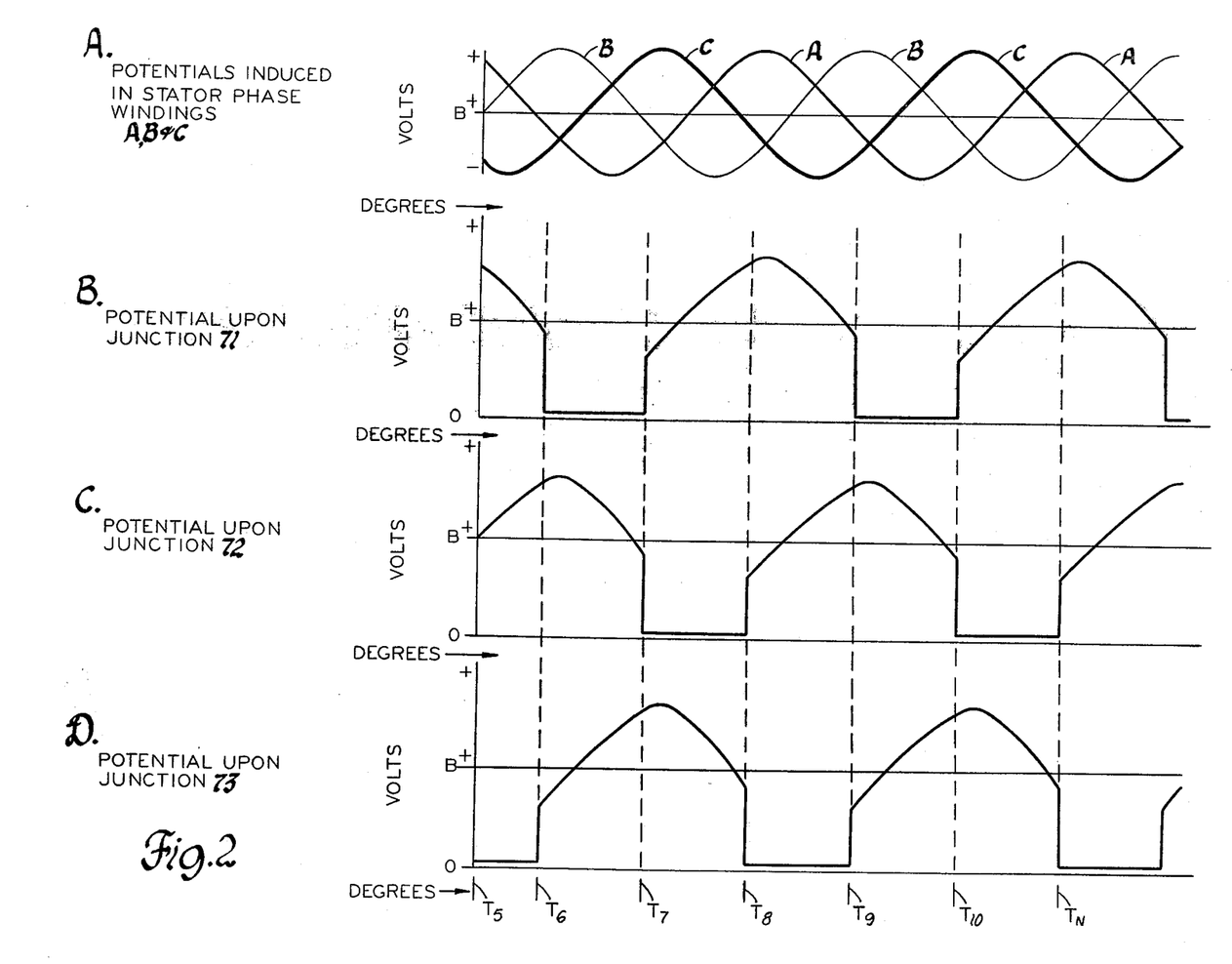
FIGS. 2 and 3 are respective sets of curves useful in understanding the operation of the circuit of FIG. 1.

The cycle of events just described repeats so long as the application of supply potential is maintained through switch 10. Referring to FIG. 2, after initial rotor start from standstill and beginning with time $T_6$, stator phase winding A, stator phase winding B and stator phase winding C are sequentially energized in that order repeatedly. This sequential stator phase winding energization produces a rotating magnetic field in a manner well known in the art that sustains rotor 8 rotation. For rotor 8 rotation in the opposite direction, the sequence of stator phase winding energization would be reversed by reversing the connection of the terminal end opposite node N of any two of leads 14, 16 and 18.

It is apparent from the foregoing description that each of commutation circuits 21, 22 and 23 corresponds to a respective stator phase winding A, B and C and that these commutation circuits are responsive to the alternating current phase displaced potential waveforms induced in stator phase windings A, B and C for sustaining rotor 8 rotation after initial start from standstill by sequentially completing and later interrupting the respective individual stator phase winding energizing circuits that results in a rotating magnetic field.

Each of commutation circuits 21, 22 and 23 includes a Norton operational amplifier circuit and an NPN transistor Darlington pair. Each combination of Norton operational amplifier circuit 40 and NPN transistor Darlington pair 15 of commutation circuit 21, Norton operational amplifier circuit 50 and NPN transistor Darlington pair 17 of commutation circuit 22 and Norton operational amplifier circuit 60 and NPN transistor Darlington pair 19 is an electrically operable switching arrangement that is capable of being operated to first and second operating conditions in response to the application thereto of electrical signals of a value less than and greater than a predetermined magnitude and is effective to complete and interrupt the stator phase winding to which each corresponds when in the first and second operating conditions, respectively. The switch point of each is determined by the supply potential level and the ohmic value of respective input resistors 41, 51 and 61 that determines the predetermined magnitude that the applied electrical signals must be less than and greater than. When the electrical signal applied to these switching arrangements is of a level less than the predetermined magnitude, the applied electrical signal supplies less current to the minus (−) input terminal of the Norton operational amplifier circuit than is supplied to the plus (+) input terminal, consequently, the switching arrangement is triggered to the operating condition in which the stator phase winding energizing circuit for the stator phase winding to which it corresponds is completed and when the applied electrical signal is of a level greater than the predetermined magnitude, the applied signal supplies more current into the minus (−) input terminal of the Norton operational amplifier circuit than is supplied to the plus (+) input terminal, consequently, the switching arrangement is triggered to the operating condition in which the stator phase winding energizing circuit for the stator phase winding to which it corresponds is interrupted. The potential waveform induced in stator phase winding A is applied to the minus (−) input terminal of Norton operational amplifier circuit 40 of the corresponding switching arrangement through resistor 74, capacitor 75 and resistor 76. The potential waveform induced in stator phase winding B is applied to the minus (−) input terminal of Norton operational amplifier circuit 50 of the corresponding switching arrangement through resistor 77, capacitor 78 and resistor 79. The potential waveform induced in stator phase winding C is applied to the minus (−) input terminal of Norton operational amplifier circuit 60 of the corresponding switching arrangement through resistor 80, capacitor 81 and resistor 82.

It may be noted that upon the charge of capacitor 28 of start circuit 20 subsequent to the electrical closure of switch 10, this capacitor remains in the charged condition to maintain start circuit 20 disabled so long as switch 10 remains closed.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases, comprising:

means for initiating rotor rotation from standstill whereby said phase displaced potential waveforms are initially induced in said stator phase windings;

means arranged for connection to an external supply potential source for producing a switch point reference signal; and means responsive to said phase displaced potential waveforms induced in said stator phase windings for sustaining rotor rotation by sequentially completing and later interrupting said respective individual stator phase winding energizing circuits, said means including a control means connected to each said stator phase winding that is operated to effect the completion of the said stator phase winding energizing circuit for the said stator phase winding to which it is connected in response to each negative going portion of the said potential waveform induced in that stator phase winding attaining a level that has a predetermined relationship to said switch point reference signal and is operated to effect the interruption of this energizing circuit in response to the operation of another one of said control means connected to another one of said stator phase windings to effect the completion of the said stator phase winding energizing circuit for that stator phase winding whereby, after initiation of rotor rotation from standstill, said stator phase windings may be sequentially energized and later deenergized to produce a rotating magnetic field that sustains rotor rotation.

2. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases, comprising:

means for initiating rotor rotation from standstill whereby said phase displaced potential waveforms are initially induced in said stator phase windings;

means arranged for connection to an external supply potential source for producing a switch point reference signal;

an electrically operable switching arrangement connected to each of said stator phase windings that is capable of being actuated to first and second operating conditions in response to the application thereof of respective electrical signals of a value less than and greater than that of said switch point reference signal for producing while in said first operating condition an electrical output signal that effects the completion of the said stator phase winding energizing circuit for the said stator phase winding to which it is connected and, upon being actuated to said second operating condition, for terminating said electrical output signal that effects the interruption of the said stator phase winding energizing circuit for the said stator phase winding to which it is connected;

means for applying the said potential waveform induced in each of said stator phase windings to the said switching arrangement connected thereto for actuating said switching arrangement to said first operating condition during each negative going portion of the induced potential waveform; and means for applying the said electrical output signal of each of said switching arrangements to another one of said switching arrangements that has previously been actuated to said first operating condition for actuating the said switching arrangement to which it is applied to said second operating condition to effect the interruption of the said stator phase winding energizing circuit for the stator phase winding to which said switching arrangement to which said output signal is applied is connected whereby, after initiation of rotor rotation from standstill, said stator phase windings may be sequentially energized and later deenergized to produce a rotating magnetic field that sustains rotor rotation.

3. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases, comprising:

means for initiating rotor rotation from standstill whereby said phase displaced potential waveforms are initially induced in said stator phase windings, said means including means for producing an electrical output signal pulse of a predetermined duration upon the application of supply potential;

means arranged for connection to an external supply potential source for producing a switch point reference signal;

an electrically operable switching arrangement connected to each of said stator phase windings that is capable of being actuated to first and second operating conditions in response to the application thereof of respective electrical signals of a value less than and greater than that of said switch point reference signal for producing while in said first operating condition an electrical output signal that effects the completion of the said stator phase winding energizing circuit for the said stator phase windings to which it is connected and, upon being actuated to said second operating condition, for terminating said electrical output signal that effects the interruption of the said stator phase winding energizing circuit for the said stator phase winding to which it is connected, each said switching arrangement being actuatable to said first operating condition in response to the application of supply potential and thereafter in response to each negative going portion of the said potential waveform induced in the said stator phase winding to which it is connected and being actuatable to said second operating condition in response to the said output signal of another one of said switching arrangements while in said first operating condition;

means for applying said output signal pulse of said rotor rotation initiating means to at least a selected one of said switching arrangements in such a manner as to actuate said switching arrangement to said first operating condition;

means for applying the said potential waveform induced in each of said stator phase windings to the said switching arrangement to which it is connected for actuating said switching arrangement to said first operating condition during each negative going portion of the induced potential waveform; and means for applying the said electrical output signal of each of said switching arrangements to another one of said switching arrangements that has previously been actuated to said first operating condition for actuating the said switching arrangement to which it is applied to said second operating condition to effect the interruption of the said stator phase winding energizing circuit for the stator phase winding to which said switching arrangement to which said output signal is applied is connected whereby, after initiation of rotor rotation from standstill, said stator phase windings may be sequentially energized and later deenergized to produce a rotating magnetic field that sustains rotor rotation.

4. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases, comprising:

means for initiating rotor rotation from standstill whereby said phase displaced potential waveforms are initially induced in said stator phase windings;

means arranged for connection to an external supply potential source for producing a switch point reference signal;

a control means including an output circuit means corresponding to each of said stator phase windings that is capable of being actuated to first and second operating conditions in response to the application thereto of respective electrical signals of a value less than and greater than that of said switch point reference signal for producing while in said first operating condition an electrical output signal upon said output circuit means and, upon being actuated to said second operating condition, for terminating said electrical output signal;

an electrically operable switching device including input circuit means connected to each of said stator phase windings that is actuated to electrical circuit closed and electrical circuit open operating conditions for completing and interrupting, respectively, the said stator phase winding energizing circuit for the said stator phase windings to which it is connected in response to the application of an electrical control signal to said input circuit means and in response to the subsequent removal of said control signal from said input circuit means;

means for connecting said output circuit means of each of said control means to said input circuit means of the said switching device connected to the said stator phase winding to which it corresponds;

means for applying the said potential waveform induced in each of said stator phase windings to the corresponding said control means for actuating said control means to said first operating condition during each negative going portion of the induced potential waveform to effect the completion of the said stator phase winding energizing circuit for the said stator phase winding to which it corresponds; and means for applying the said electrical output signal of each of said control means to another one of said control means that has previously been actuated to said first operating condition for actuating the said control means to which it is applied to said second operating condition to effect the interruption of the said stator phase winding energizing circuit for the stator phase winding to which said control means to which said output signal is applied corresponds whereby, after initiation of rotor rotation from standstill, said stator phase windings may be sequentially energized and later deenergized to produce a rotating magnetic field that sustains rotor rotation.

5. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases, comprising:

means for initiating rotor rotation from standstill whereby said phase displaced potential waveforms are initially induced in said stator phase windings, said means including means for producing an electrical output signal pulse of a predetermined duration upon the application of supply potential;

means arranged for connection to an external supply potential source for producing a switch point reference signal;

a control means including an output circuit means corresponding to each of said stator phase windings that is capable of being actuated to first and second operating conditions in response to the application thereto of respective electrical signals of a value less than and greater than that of said switch point reference signal for producing while in said first operating condition an electrical output signal upon said output circuit means and, upon being actuated to said second operating condition, for terminating said electrical output signal;

an electrically operable switching device including input circuit means connected to each of said stator phase windings that is actuated to electrical circuit closed and electrical circuit open operating conditions for completing and interrupting, respectively, the said stator phase winding energizing circuit for the said stator phase windings to which it is connected in response to the application of an electrical control signal to said input circuit means and in response to the subsequent removal of said control signal from said input circuit means; means for connecting said output circuit means of each of said control means to said input circuit means of the said switching device connected to the said stator phase winding to which it corresponds;

means for applying said output signal pulse of said rotor rotation initiating means to at least a selected one of said control means in such a manner as to force the actuation of said control means to said first operating condition to effect the completion of the said stator phase winding energizing circuit for the said stator phase winding to which each said force actuated control means corresponds;

means for applying the said potential waveform induced in each of said stator phase windings to the corresponding said control means for actuating said control means to said first operating condition during each negative going portion of the induced potential waveform to effect the completion of the said stator phase winding energizing circuit for the said stator phase winding to which it corresponds; and means for applying the said electrical output signal of each of said control means to another one of said control means that has previously been actuated to said first operating condition for actuating the said control means to which it is applied to said second operating condition to effect the interruption of the said stator phase winding energizing circuit for the stator phase winding to which said control means to which said output signal is applied corresponds whereby, after initiation of rotor rotation from standstill, said stator phase windings may be sequentially energized and later deenergized to produce a rotating magnetic field that sustains rotor rotation.

* * * * *